(12) United States Patent
Kato

(10) Patent No.: US 6,467,912 B1
(45) Date of Patent: Oct. 22, 2002

(54) PROJECTION OPTICAL SYSTEM AND PROJECTION APPARATUS

(75) Inventor: Masatake Kato, Kunitachi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/385,895

(22) Filed: Aug. 30, 1999

(30) Foreign Application Priority Data

Sep. 1, 1998 (JP) ............................................ 10-262392

(51) Int. Cl.[7] .............................................. G03B 21/00
(52) U.S. Cl. ........................................ 353/101; 353/69
(58) Field of Search ............................ 353/31, 69, 70, 353/100, 101; 359/676, 689

(56) References Cited

U.S. PATENT DOCUMENTS

| | | | | |
|---|---|---|---|---|
| 4,733,953 A | * | 3/1988 | Yamamoto et al. | |
| 5,161,042 A | | 11/1992 | Hamada | |
| 5,597,222 A | * | 1/1997 | Doany et al. | ................. 353/33 |
| 5,905,596 A | * | 5/1999 | Watanabe | ................... 359/663 |
| 5,963,375 A | * | 10/1999 | Kreitzer | ...................... 359/650 |
| 6,172,816 B1 | * | 1/2001 | Tadic-Galeb et al. | ....... 359/649 |
| 6,193,376 B1 | * | 2/2001 | Hayashi et al. | ............... 353/30 |
| 6,195,209 B1 | * | 2/2001 | Kreitzer et al. | ............. 359/649 |

FOREIGN PATENT DOCUMENTS

JP          2922185          4/1997

* cited by examiner

*Primary Examiner*—William Dowling
(74) *Attorney, Agent, or Firm*—Fitzpatrick, Cella, Harper & Scinto

(57) ABSTRACT

A projection optical system for projecting onto a screen an image formed on a display device having a plurality of pixel sets each of which is composed of at least three pixels arranged in correspondence to at least three color light beams of respective different wavelengths. The projection optical system includes a projection lens formed so that lateral chromatic aberration for a color light beam having a wavelength longer than that of a predetermined color light beam has the same sign as that of lateral chromatic aberration for a color light beam having a wavelength shorter than that of the predetermined color light beam.

6 Claims, 10 Drawing Sheets

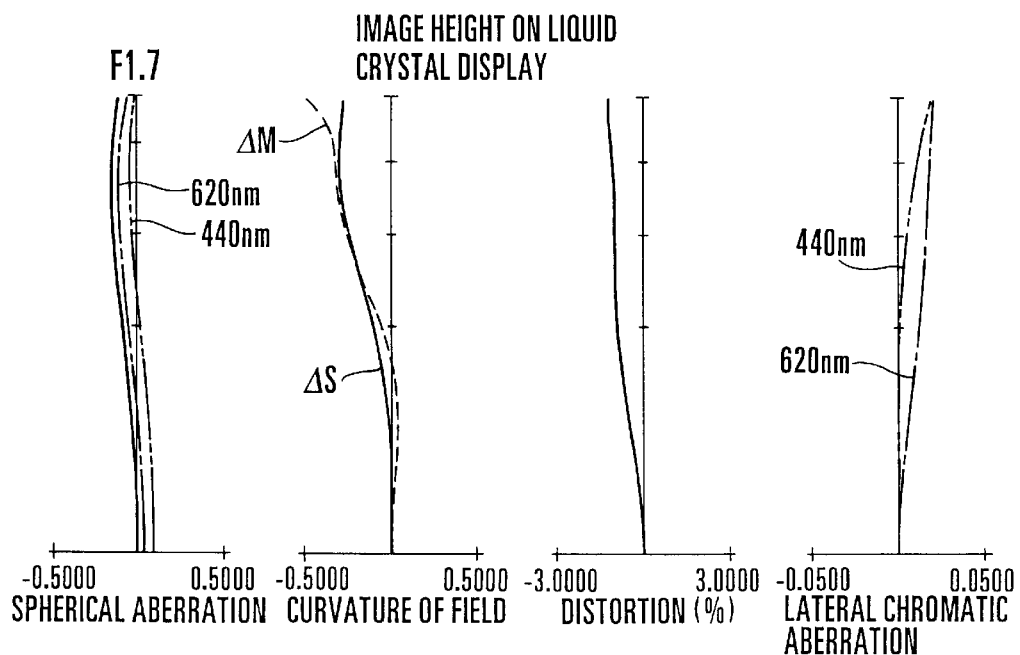
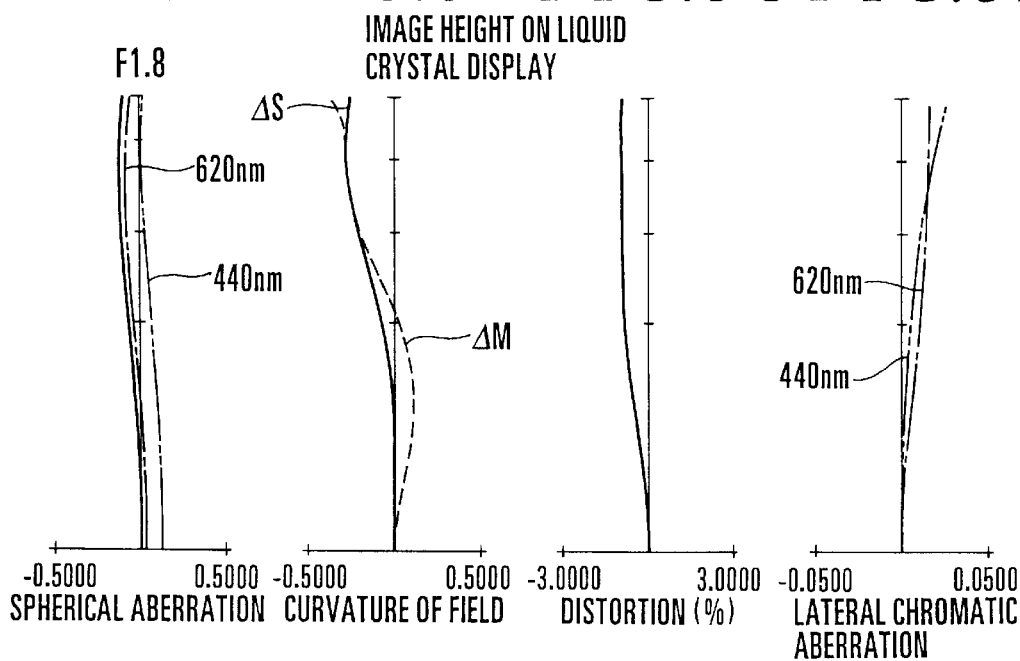

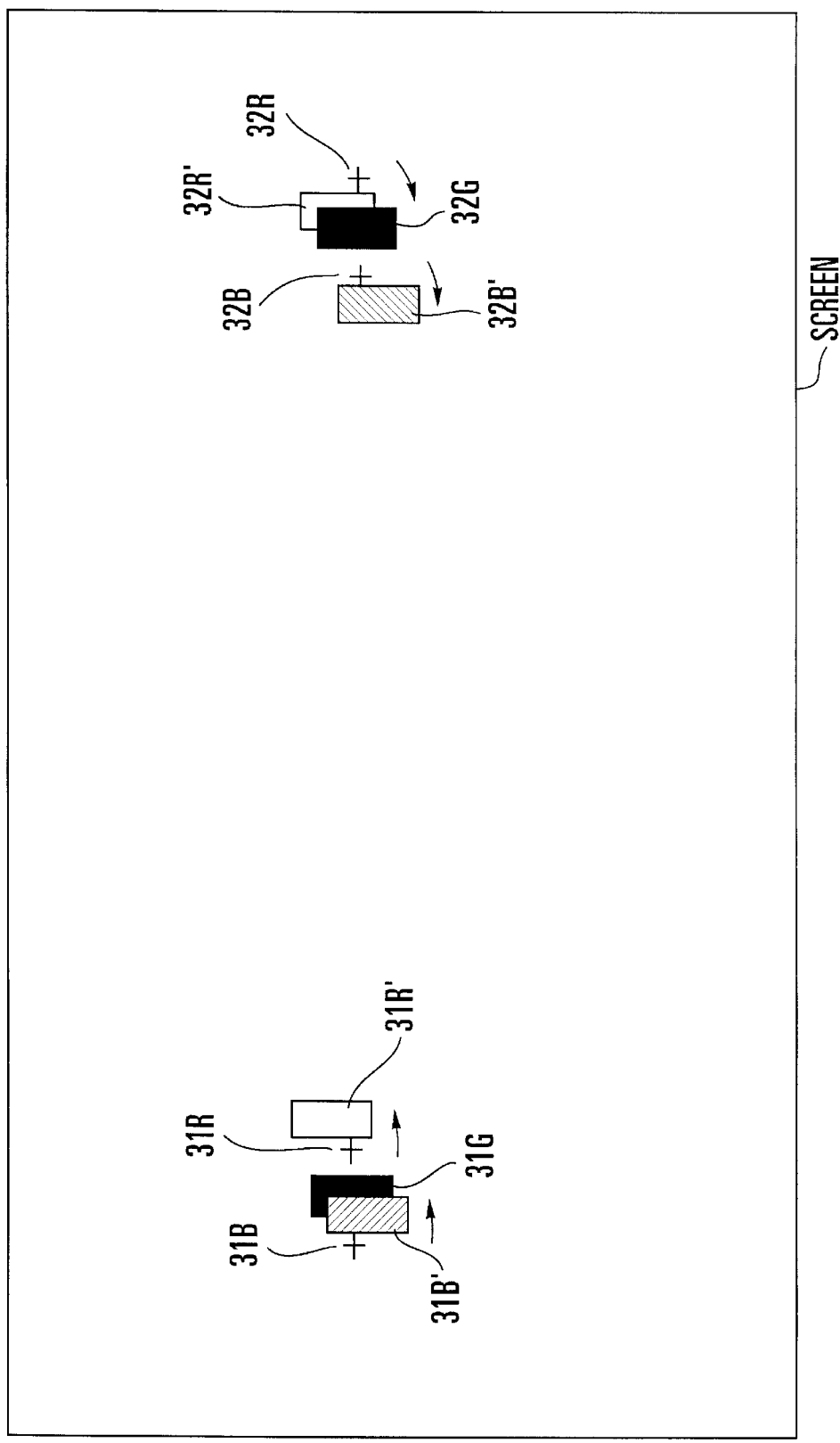

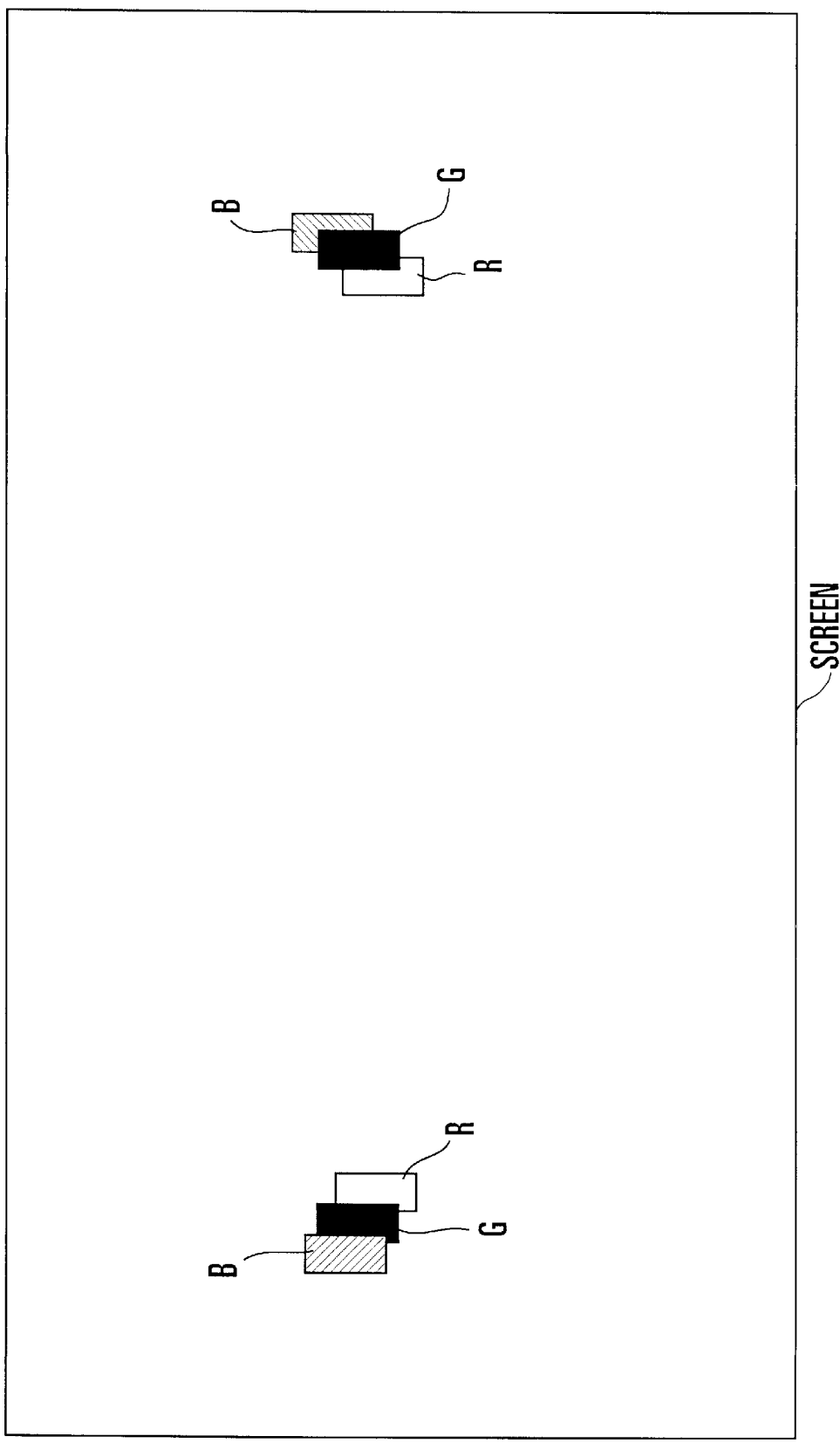

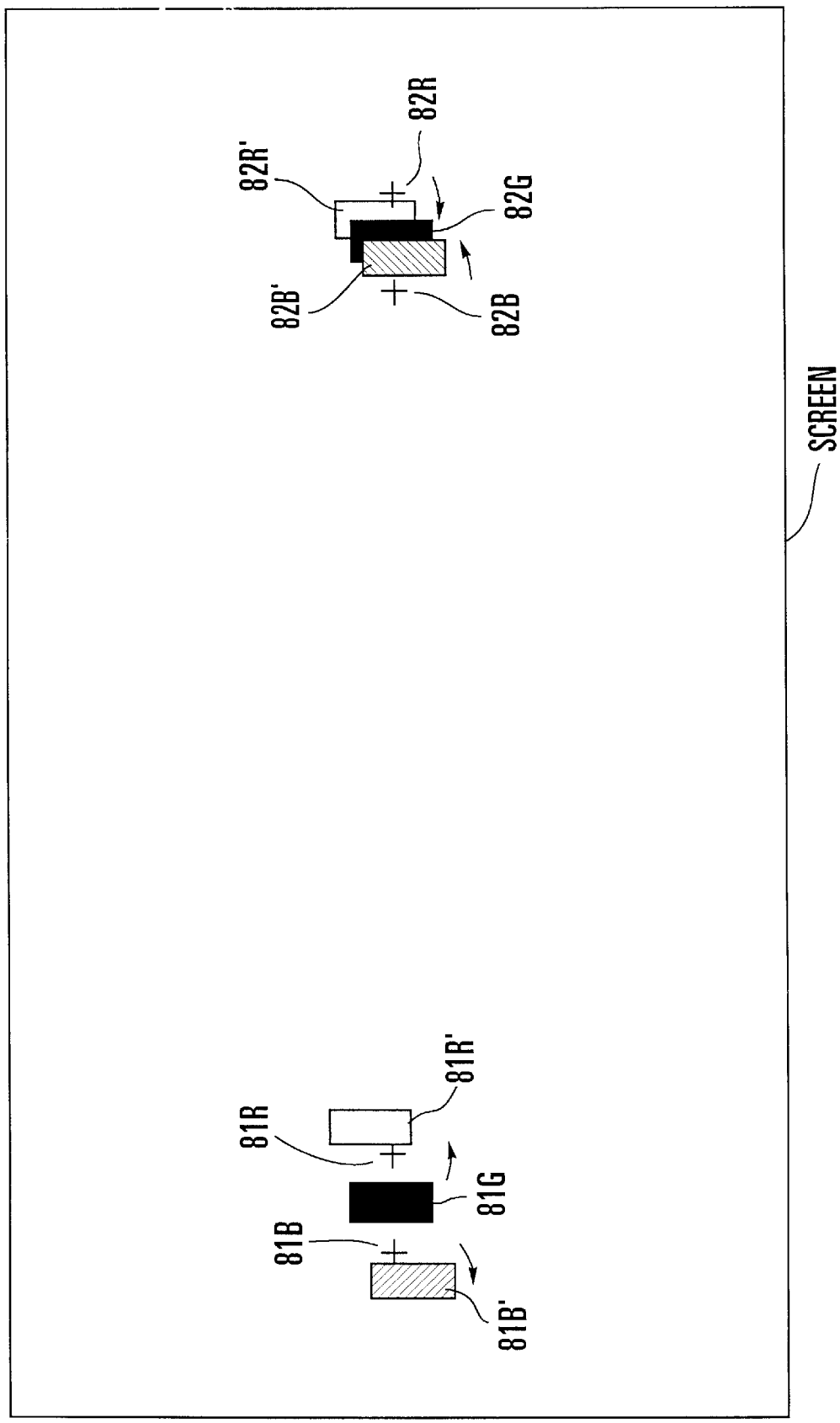

PROJECTION OPTICAL SYSTEM AND PROJECTION APPARATUS

BACKGROUND OF THE INVENTION

1. Field of the Invention

The present invention relates to projection optical systems and projection apparatuses and, more particularly, to a projection optical system and a projection apparatus suited to be used with a single-panel color liquid crystal display device, in which three light beams of R (red), G (green) and B (blue) colors illuminate an array of picture elements on a liquid crystal display panel at different angles of incidence, and all of the light beams exiting from these picture elements are combined in passing through different pupils in a position of a common projection lens and are projected onto a screen.

2. Description of Related Art

The display apparatus (projection apparatus) well known in the past employs a plurality of liquid crystal display panels or like display elements and projects the images of different original colors in the respective panels onto a screen where a picture is produced in the whole gamut of colors. Recently, as the resolution of the image to be projected has been becoming ever higher, there is a strong demand for reducing the bulk and size of the whole apparatus. For the projection lens, too, it is desired to have its size reduced and its imaging performance improved accordingly.

Usually, in order to make the brightness and definition of the projected picture to be high at once, the white light from a light source is separated out to three light beams of original colors R, G and B, and three display elements are employed for producing the corresponding images to the color separation. These three images of different colors formed on the three display elements are combined by one projection lens and are projected onto the screen. Such a projection apparatus is of the so-called three-panel type.

In this case, for the light source, there are many incandescent lamps such as halogen, xenon and metal halide ones. The more luminous the lamp to be used, the brighter the projected picture on the screen becomes.

The three-panel projection apparatus can advantageously utilize the illuminating light from a common white light source and, therefore, obtain a picture nearly three times brighter than that obtained from a single panel of liquid crystal display despite the use of three original colors.

Further, concerning even with the increase of the definition, if the three liquid crystal display elements of the same picture element number in the light beams of colors, R, G and B are mixed by the law of addition strictly on the screen, one set of picture elements of different colors can reproduce a perfect white. Actually, however, the projection lens that combines the three color light beams in projection has lateral chromatic aberration, causing the three picture elements of different colors in each set to be taken out of coincidence, in short, a color offset to occur. How to solve this is a problem as has been put on the projection lens.

In another aspect, for the three-panel type, because the structure of construction becomes far more complicated than that of the single-panel one, there are also disadvantages of hardly manufacturing it economically and increasing the size.

To improve the above disadvantages of the three-panel type, it has been known in the art to provide a projector of the single-panel type in a simple form with the brightness increased, as disclosed in, for example, Japanese Patent No. 2622185, the constituent Em -parts of which are shown in FIG. 7.

In FIG. 7, a white light source 41 is backed by an elliptic reflector 42. A condenser lens 43 is positioned with its object point at the focus of the elliptic reflector 42 to produce parallel light beams. In front of the condenser lens 43 there are arranged three dichroic mirrors 44R, 44G and 44B having optical properties of selectively reflecting light beams of wavelengths in red (R), green (G) and blue (B) regions respectively, leaving the other light beams to pass therethrough. The red and blue dichroic mirrors 44R and 44B each make an equal angle of θ degrees but in opposite direction with respect to the green dichroic mirror 44G.

Therefore, the reflected rays of light converge to an angle of 2θ, arriving at a liquid crystal display element 46.

A micro lens array 45 is positioned just in front of the liquid crystal display element 46 and mounted in unison therewith. Micro lenses constituting the micro lens array 45 are so arranged that the color light beams R, G and B separated out by the dichroic mirrors 44R, 44G and 44B each illuminate the ones of the pixels of an image which are driven for the same color at a time by the color signal. This principle will be described more fully later. The light beams that have passed through the respective pixels pass through different pupils 48R, 48G and 48B in position of a projection lens 47, forming a picture on a screen 49.

FIG. 8 is a schematic sectional view of the conventional example of the liquid crystal display element 46 and the micro lens array 45 shown in FIG. 7. The liquid crystal display element 46 is composed of two glass plates 52 and 53 with a liquid crystal layer 50 sealed therebetween. Responsive to control signals for the color light beams R, G and B, electrodes 51R, 51G and 51B in the liquid crystal layer 50 turn on and off the pixels. All the pixels are arranged in a mosaic or stripe fashion.

The color light beams emerge from the pixels at different angles like the different angles of incidence, entering the projection lens 47. On the pupils 48R, 48G and 48B of the projection lens 47. Therefore, the useful areas of the light beams slightly differ with different colors as shown in FIG. 7.

As a result, the projection lens 4 is required that its value of F-number be smaller than that for the three-panel type, that is, to be brighter.

In the three-panel projection apparatus, if some lateral chromatic aberration remains in the projection lens for projecting light beams from a color liquid crystal display element onto a screen, the perfect agreement of the R, G and B pixels on the liquid crystal element does not assure avoidance of producing a color offset on the screen, deteriorating the picture quality. It is now assumed that, in the projection lens, there are lateral chromatic aberrations for the three colors as shown in FIG. 9, where the lateral chromatic aberration is in the abscissa and the image height on the screen is in the ordinate.

In FIG. 9, for the marginal zone of the liquid crystal display element, the lateral chromatic aberration is plus in the B light and minus in the R light as compared with that in the G light. It is to be noted that the liquid crystal display surface is taken as the object surface, and the screen is taken as the image plane. That is, on the screen, any picture element for the R light that should overlap the corresponding picture element for the G light as a rule shifts in a direction to the center of the screen, while any picture element for the B light shifts in the reverse direction. It is to be noted that, in consideration of the projection lens only at its influence, the left and right halves of the screen are in point symmetry with respect to the optical axis of the projection lens. So, there is no asymmetry between the left and right marginal zones. Usually, the green light is most intense and looks prominent, and the blue light is lower in relative luminous efficiency than even the red light. This situation is depicted by exaggeration in FIG. 10.

On the other hand, for the single-panel type, it is supposed that the projection lens having the same lateral chromatic aberrations as those in FIG. 9 is in use. The pixels in the panel are assumed to have a stripe-like arrangement such that the pixel for the G light is flanked by the left and right pixels for the R light and B light. This order may be exchanged without causing any affection to the essence.

In FIG. 11, similar to FIG. 10, the shift of the picture elements on the screen is shown. With the green picture element 81G as a reference in the left marginal zone, even if the projection lens has no lateral chromatic aberration, the spread of the pixels in only one plane causes displacement of the red and blue picture elements to positions 81R and 81B, respectively, with the center of each of the elements marked "+". If, in addition, the lateral chromatic aberration of the projection lens is further taken into account, the picture elements 81R and 81B are shifted to positions 81R' and 81B', respectively. Thus, a color offset occurs.

Conversely, looking at the right marginal zone, the red and blue picture elements are displaced from positions 82R and 82B which are ideal in respect to the position 82G of the green picture element as the reference, to positions 82R' and 82B', respectively. Thus, the color offset in the right marginal zone is asymmetric to that in the left marginal zone. This also constitutes a drawback intrinsic solely to the single-panel type color liquid crystal display device.

Then, similarly, the lateral chromatic aberration of the projection lens is considered. Since the lateral chromatic aberration of the projection lens is in point symmetry with respect to the optical axis of the lens, the picture elements shift in the same direction as that in the left marginal zone. As a result, in the right marginal zone, the G, R and B light beams shift in the good direction, overlapping each other, and any color offset comes to hardly occur. In this case, however, the symmetry between the left and right marginal zones collapses extremely, and, therefore, this drawback becomes objectionably conspicuous.

BRIEF SUMMARY OF THE INVENTION

The present invention, in application to the projection optical system for the single-panel type display element, has set forth proper rules for the lateral chromatic aberration of the projection lens constituting part of the optical system. It is, therefore, an object of the invention to provide a projection lens and a projection apparatus which diminish the asymmetry of color offset between the left and right marginal zones of the screen, making it possible to view pictures of good quality.

To attain the above object, in accordance with an aspect of the invention, there is provided a projection optical system for projecting onto a screen an image formed on a display device having a plurality of pixel sets each of which is composed of at least three pixels arranged in correspondence to at least three color light beams of respective different wavelengths, the projection optical system comprising a projection lens having a plurality of lens elements, wherein the projection lens is so formed that lateral chromatic aberration for a color light beam of a wavelength longer than that of a predetermined color light beam has the same sign as that of lateral chromatic aberration for a color light beam of a wavelength shorter than that of the predetermined color light beam.

Further, in accordance with another aspect of the invention, there is provided a projection apparatus, which comprises a display device having a plurality of pixel sets each of which is composed of at least three pixels arranged in correspondence to at least three color light beams of respective different wavelengths, and a projection lens for projecting onto a screen an image formed on the display device, wherein the projection lens is so formed that lateral chromatic aberration for a color light beam of a wavelength longer than that of a predetermined color light beam has the same sign as that of lateral chromatic aberration for a color light beam of a wavelength shorter than that of the predetermined color light beam.

The above and further objects and features of the invention will become apparent from the following detailed description of a preferred embodiment thereof taken in conjunction with the accompanying drawings.

BRIEF DESCRIPTION OF THE SEVERAL VIEWS OF THE DRAWINGS

FIGS. 4A to 4D are graphic representations of the aberrations in the wide-angle end of the projection lens according to the embodiment of the invention.

FIGS. 5A to 5D are graphic representations of the aberrations in the telephoto end of the projection lens according to the embodiment of the invention.

FIG. 6 is a plan view for explaining the effect of the lateral chromatic aberration of the projection lens on the screen according to the embodiment of the invention.

FIG. 10 is a plan view for explaining the color offset in the three-panel display device.

FIG. 11 is a plan view for explaining the color offset in the single-panel display device.

DETAILED DESCRIPTION OF THE INVENTION

Hereinafter, a preferred embodiment of the invention will be described in detail with reference to the drawings.

Figure 1:
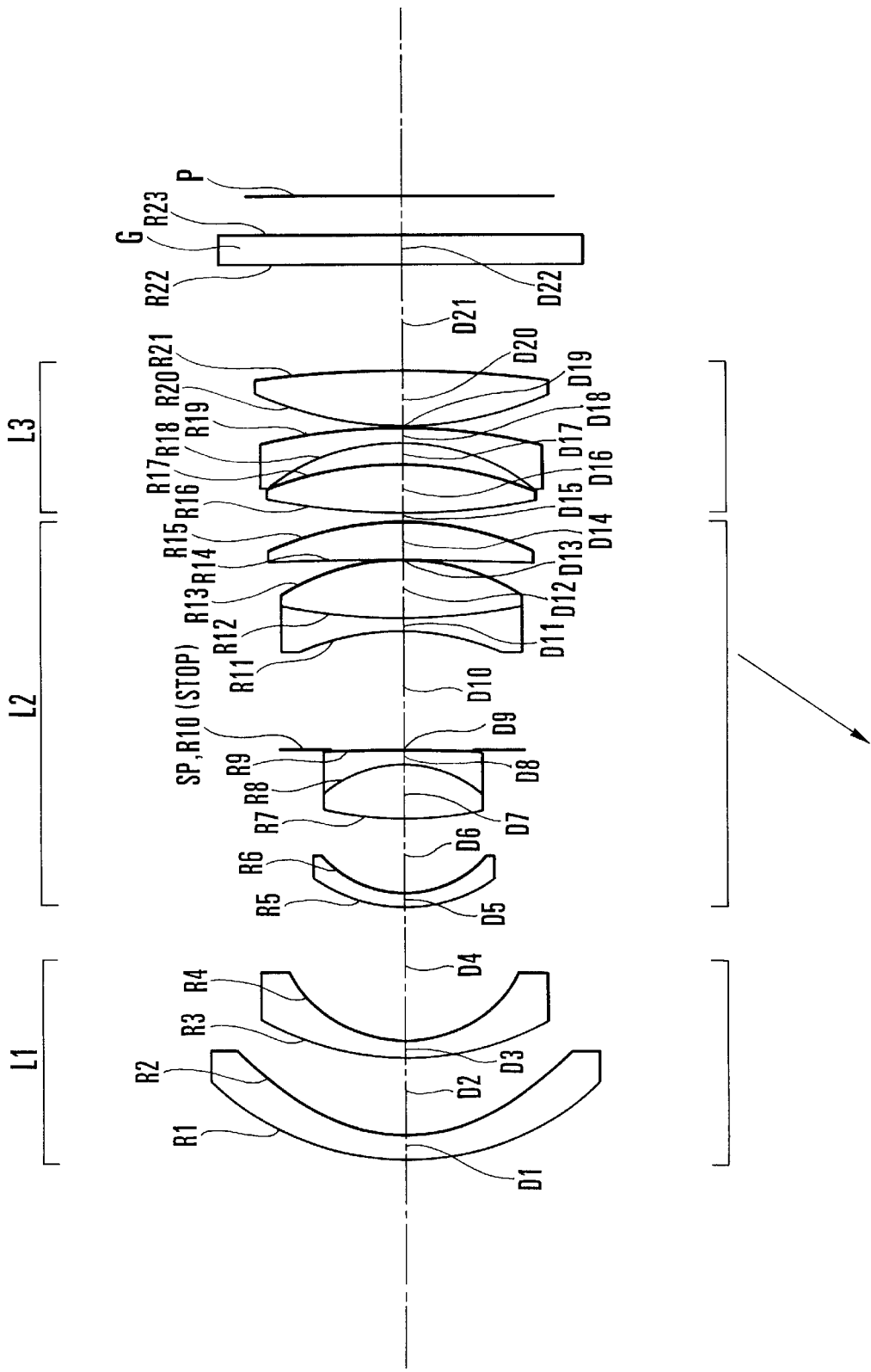
FIG. 1 is a longitudinal sectional view of a projection lens according to an embodiment of the invention.
Figure 2:
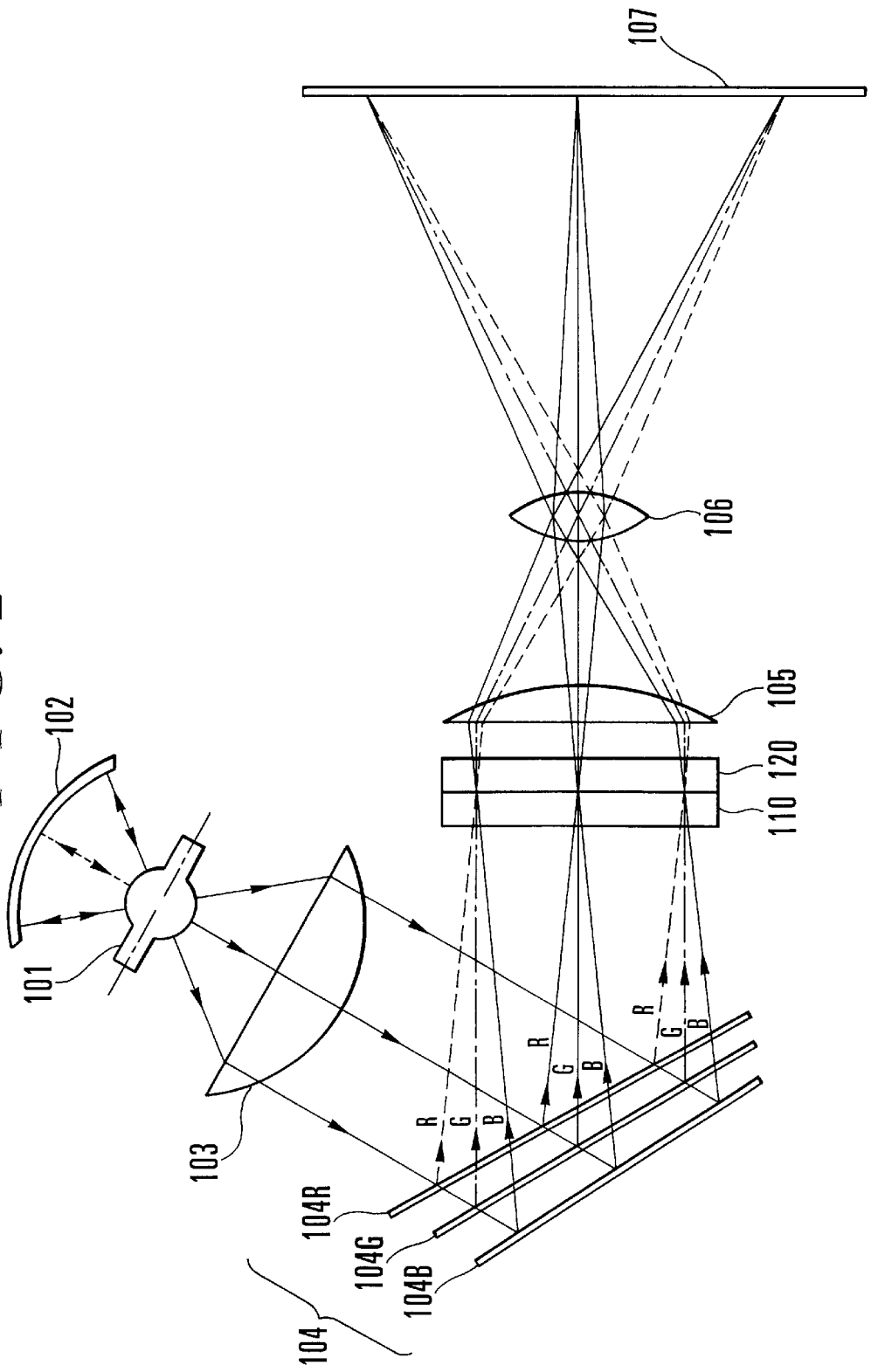
FIG. 2 is a schematic diagram of a single-panel type color liquid crystal projector using the projection lens shown according to the embodiment of the invention.
Figure 3:
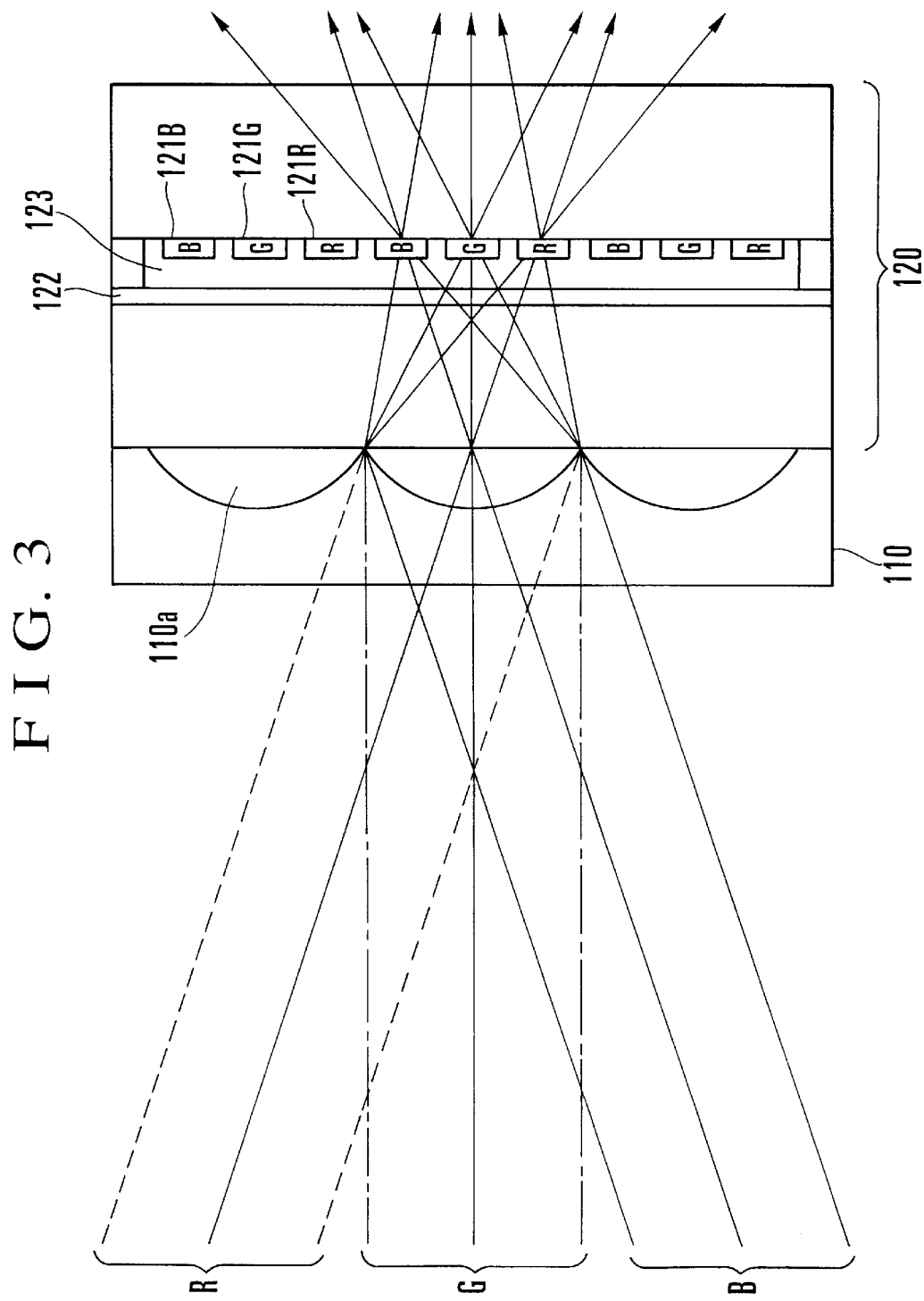
FIG. 3 is a fragmentary sectional view in an enlarged scale of a liquid crystal display element shown in FIG. 2.

FIG. 1 is a longitudinal sectional view of a projection lens constituting a projection optical system according to an embodiment of the invention. FIG. 2 schematically shows the main parts of a projection apparatus with the projection lens shown in FIG. 1 applied to the single-panel type color liquid crystal projector. FIG. 3 is a fragmentary sectional view in an enlarged scale of a liquid crystal display element shown in FIG. 2 and an associated part therewith.

Referring first to FIG. 2, the construction and arrangement of the constituent parts of the projection apparatus are described below.

Figure 7:
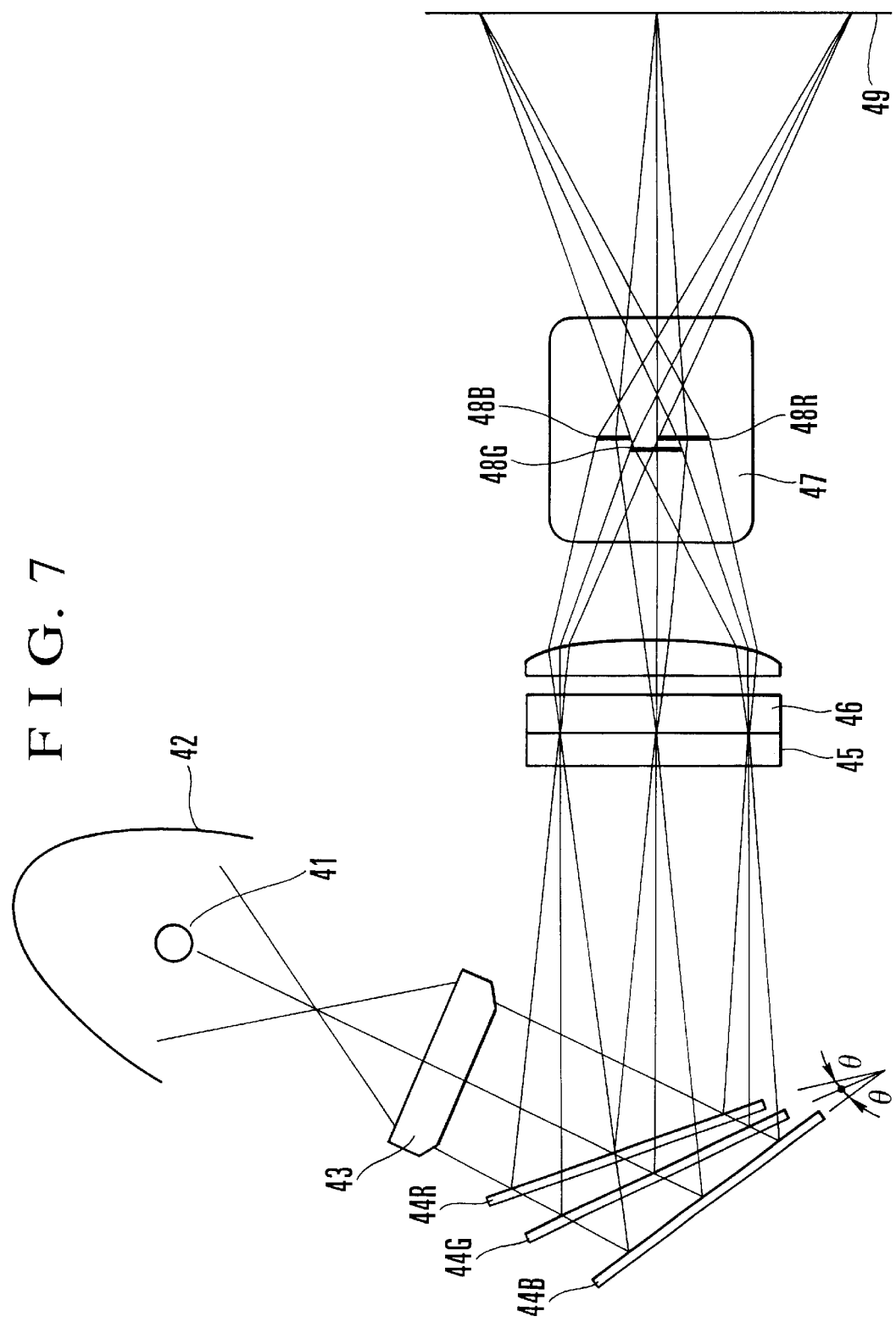
FIG. 7 is a diagram of geometry for explaining the principle of the conventional single-panel color display device.
Figure 8:
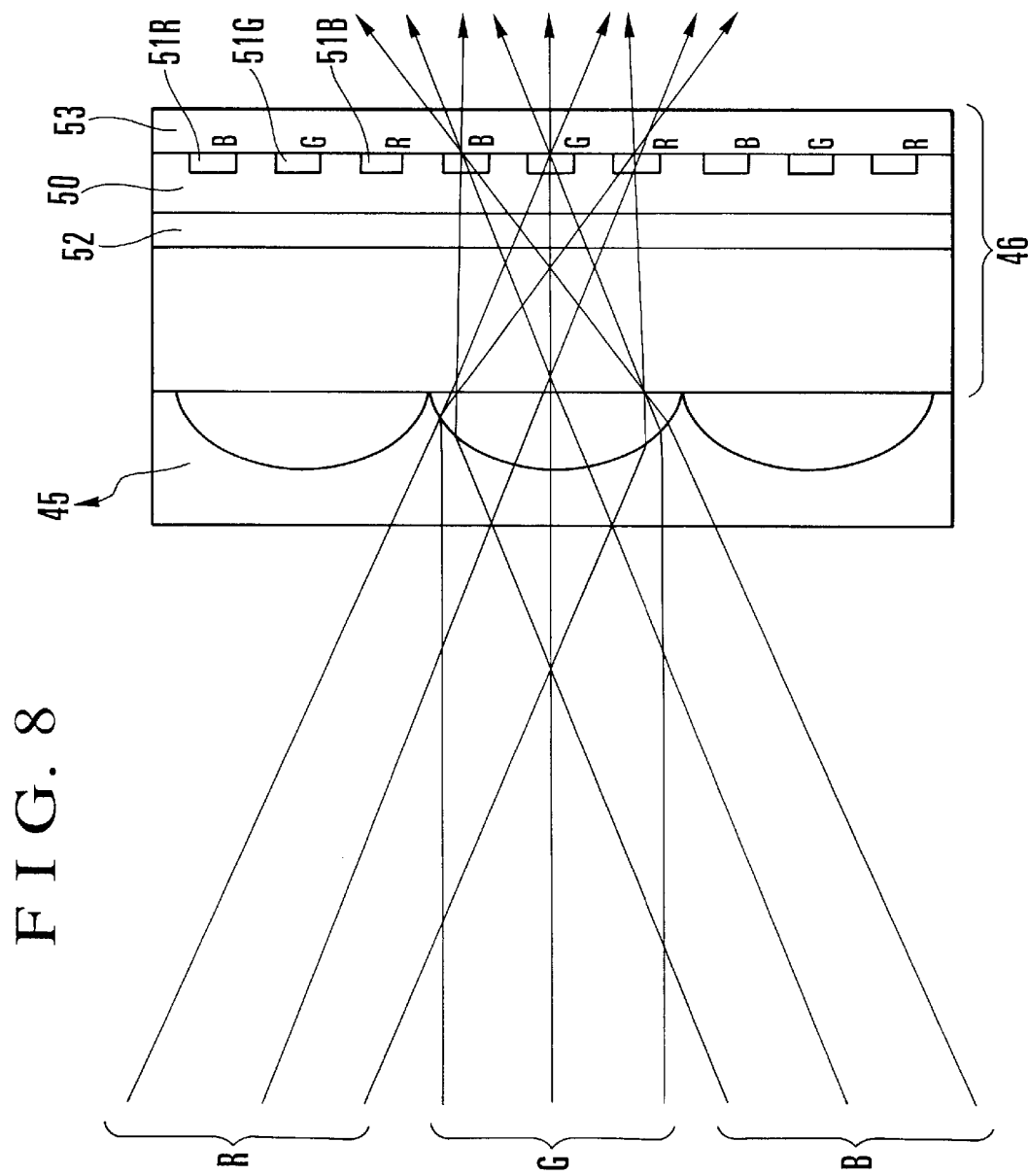
FIG. 8 is a sectional view of the construction of the conventional single-panel color liquid crystal display element.
Figure 9:
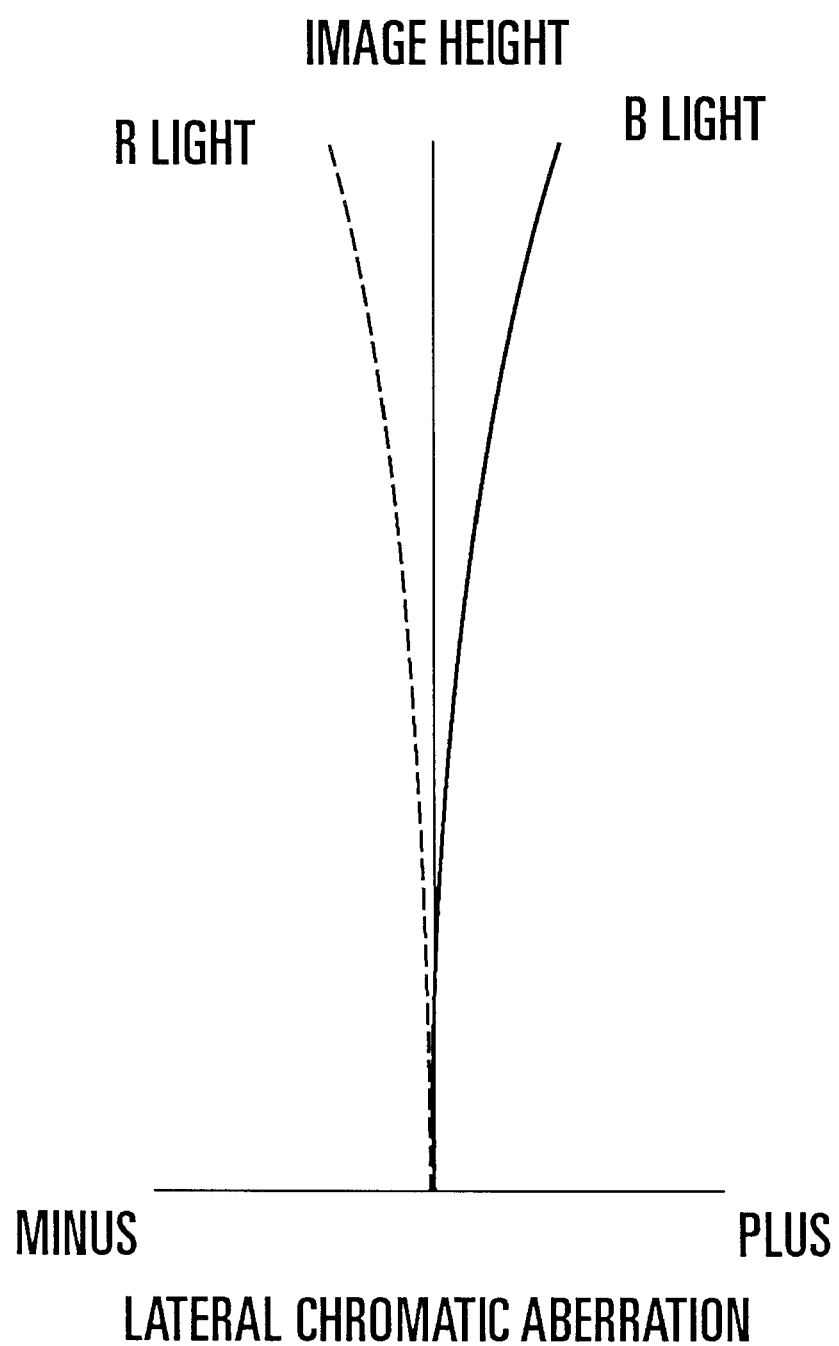
FIG. 9 is a graph for explaining the lateral chromatic aberration of the conventional projection lens in the conventional single-panel color display device.

In FIG. 2, a white light source 101 radiates rays of light to all directions, which are nearly collimated by a reflection mirror 102 and a condenser lens 103. The thus-obtained parallel light beams enter a dichroic mirror assembly 104, wherein three dichroic mirrors 104R, 104G and 104B are arranged in inclined relation to one another likewise as in the conventional example shown in FIG. 7. First, the dichroic mirror 104R reflects red light in the white light, leaving the rest to pass therethrough. Then, the dichroic mirror 104G reflects green light of the rest. Then, the dichroic mirror 104B reflects the last reset or blue light.

The white light is thus reflected by the dichroic mirror assembly 104, producing three light beams of red (R), green (G) and blue (B) colors at respective different angles. The three light beams illuminate a liquid crystal display element 120, which is a display device, at different angles from one another. The liquid crystal display element 120 in the present embodiment is constructed so that three pixels in correspondence to the respective color light beams R, G and B are taken as one set, and such a set is plural in number as shown in FIG. 3.

FIG. 3 is a diagram of a geometry for explaining the optical functions at and near the liquid crystal display element 120. A scanning electrode 122 and signal electrodes 121B, 121G and 121R for blue (B), green (G) and red (R) picture elements, respectively, are formed in a liquid crystal layer 123. A great number of micro lenses 110a are two-dimensionally spread in a micro lens array 110. By selectively exciting the signal electrodes 121B, 121G and 121R, the picture elements corresponding to the excited signal electrodes can be controlled individually. For every one micro lens 110a, there is one picture element for each of the R, G and B colors.

In this case, the red illuminating light enters any one of the micro lenses and emerges therefrom, converging to the corresponding one of the R picture elements to that micro lens. Likewise, the green and blue illuminating lights entering through that micro lens converge to the respective corresponding ones of the G and B picture elements to that micro lens. With the use of the white light as the original light, the R, G and B picture elements of the single-panel liquid crystal display element are illuminated by the red, green and blue light beams, respectively, without using color filters.

Returning to FIG. 2, the image in the liquid crystal display element 120 becomes a color image by the action described above, being projected onto a screen 107 in an enlarged scale by a field lens 105 and a projection lens 106.

Next, the configuration of the projection lens 106 is described with reference to FIG. 1.

Referring to FIG. 1, the projection lens 106 comprises, in order from the screen side, a first lens unit L1 of negative refractive power, a second lens unit L2 of positive refractive power and a third lens unit L3 of positive refractive power. In the projection lens according to the present embodiment, the second lens unit L2 is moved toward the screen side to vary the magnification from the wide-angle end to the telephoto end.

The first lens unit L1 comprises two negative lenses of meniscus form convex toward the screen side. The second lens unit L2 comprises, in order from the screen side, a negative lens of meniscus form convex toward the screen side, a cemented lens composed of a bi-convex positive lens and a negative lens cemented together, a stop, a cemented lens composed of a bi-concave negative lens and a positive lens cemented together, and a positive lens having a convex surface facing the liquid crystal display element side. The third lens unit L3 comprises, in order from the screen side, a bi-convex positive lens, a negative lens of meniscus form convex toward the liquid crystal display element side, and a bi-convex positive lens. G is a glass block such as a face plate, color filters and others. P is an object plane (the surface of the liquid crystal display element).

In the present embodiment, when the R, G and B picture elements arrayed on the single-panel liquid crystal display element are illuminated by the corresponding light beams of different angles of incidence, and are projected onto the screen, the lateral chromatic aberrations for the R and B light beams of the projection lens are made to have values of the same sign, as measured relative to that for the G light beam.

Also, since the B light beam is lower in relative luminous efficiency than the R light beam, the lateral chromatic aberration for the B light beam relative to the G light beam may be larger than the amount of production of lateral chromatic aberration for the R light beam.

FIGS. 4A to 4D and FIGS. 5A to 5D show the aberrations of the projection lens shown in FIG. 1 (whose numerical data will be described later as a numerical example) in the wide-angle end and the telephoto end, respectively.

In the aberration graphs of FIGS. 4A to 4D and FIGS. 5A to 5D, the spherical aberrations are indicated by a solid line for the G light (whose wavelength is 550 nm), a double-dot and single-dash line for the B light (whose wavelength is 450 nm), and a single-dot and single-dash line for the R light (whose wavelength is 620 nm). The curvature of field and the distortion are shown for the G light. The lateral chromatic aberration is shown for the B light and the R light with reference to the G light.

The lateral chromatic aberrations shown in FIGS. 4D and 5D can be expressed as the offset of the picture elements on the screen, as shown in FIG. 6.

Referring to FIG. 6, similarly to FIG. 11, there is shown the displacement of the picture elements on the screen. In the left marginal zone, with the picture element 31G of the G light as the reference, even if the projection lens has no lateral chromatic aberration, the use of the array in a single panel leads to cause displacement of the R and B picture elements to the positions 31R and 31B on the screen, as has been mentioned before. In addition to that, the lateral chromatic aberration of the projection lens is further considered. Then, since, in the present embodiment, the lateral chromatic aberrations for the R light and B light are produced in the same direction, the picture elements 31B and 31R change their positions in the same direction to 31R' and 31B', respectively, thus causing a color offset in the same direction. As a result, the B light goes in a direction of overlapping the G light, while the R light moves away therefrom toward the center of the screen.

Conversely, when looking at the right marginal zone, for the picture element 32G to be taken as the reference, with the lateral chromatic aberration on consideration, as being different from the left marginal zone, the R picture element changes its position in the direction of overlapping the G picture element, while the B picture element changes its position in the direction of going farther away therefrom.

In conclusion, for the cause of the liquid crystal array of the single panel, it does not happen that any two of the picture elements of the R light, G light and B light do not completely overlap each other. In a case where, as shown in FIG. 11, the lateral chromatic aberrations for the R light and B light depart in the opposite directions, the R and B picture elements change their positions by a distance of two or more picture elements with the result of occurrence of the color offset. In the present embodiment, however, although some color offset occurs in the left and right marginal zones of the screen, it is made sure to improve the maximum displacement between the R and B picture elements.

Next, a numerical example of the invention is shown in the table below, where Ri is the radius of curvature of the i-th surface, when counted from the screen side, Di is the thickness or air separation of the i-th member, when counted from the screen side, and Ni and vi are respectively the refractive index and Abbe number of the material of the i-th member, when counted from the screen side. Also, the last two surfaces define an optical filter, face plate, or the like.

The shape of an aspheric surface is expressed in the coordinates with an X axis in the axial direction and an H axis in the direction perpendicular to an optical axis, the direction in which light advances being taken as positive, by the following equation:

$$X = \frac{(1/R)H^2}{1+\sqrt{1-(1+K)(H/R)^2}} + BH^4 + CH^6 + DH^8 + EH^{10}$$

where R is the radius of the osculating sphere, and K, B, C, D and E are the aspheric coefficients.

Numerical Example:

|  | Fno = 1:1.73<br>1:1.77 |  | 2ω = 80.0 (W)<br>2ω = 76.4 (T) |  |
|---|---|---|---|---|
| R 1 = 55.686 | D 1 = 4.50 | N 1 = 1.49376 | υ 1 = 57.4 |
| R 2 = *34.346 | D 2 = 14.75 |  |  |
| R 3 = 58.276 | D 3 = 3.25 | N 2 = 1.62193 | υ 2 = 57.1 |
| R 4 = 25.916 | D 4 = Variable |  |  |
| R 5 = 32.728 | D 5 = 2.50 | N 3 = 1.48915 | υ 3 = 70.2 |
| R 6 = 22.500 | D 6 = 13.99 |  |  |
| R 7 = 72.931 | D 7 = 10.59 | N 4 = 1.81078 | υ 4 = 40.9 |
| R 8 = −23.500 | D 8 = 2.50 | N 5 = 1.66297 | υ 5 = 42.0 |
| R 9 = −300.651 | D 9 = 0.10 |  |  |
| R10 = (Stop) | D10 = 22.65 |  |  |
| R11 = −51.845 | D11 = 2.60 | N 6 = 1.81265 | υ 6 = 25.4 |
| R12 = 122.155 | D12 = 10.94 | N 7 = 1.62556 | υ 7 = 58.2 |
| R13 = −46.977 | D13 = 0.20 |  |  |
| R14 = −522.658 | D14 = 7.05 | N 8 = 1.62556 | υ 8 = 58.2 |
| R15 = −64.011 | D15 = Variable |  |  |
| R16 = 141.418 | D16 = 9.12 | N 9 = 1.62556 | υ 9 = 58.1 |
| R17 = −73.854 | D17 = 4.06 |  |  |
| R18 = −43.805 | D18 = 3.00 | N10 = 1.81250 | υ10 = 25.4 |
| R19 = −125.614 | D19 = 0.20 |  |  |
| R20 = 69.129 | D20 = 10.37 | N11 = 1.62556 | υ11 = 58.1 |
| R21 = −251.658 | D21 = 20.00 |  |  |
| R22 = ∞ | D22 = 5.60 | N12 = 1.49200 | υ12 = 58.6 |
| R23 = ∞ |  |  |  |

*) R2: Aspheric Surface

| Variable | Focal Length | |
|---|---|---|
| Separation | 24.11 | 25.70 |
| D 4 | 25.37 | 21.44 |
| D15 | 1.75 | 5.67 |

Aspheric Coefficients:
K=−1.76309×10$^{-1}$
B=−4.79786×10$^{-7}$
C=−4.14749×10$^{-9}$
D=2.97471×10$^{-12}$
E=−1.94906×10$^{-15}$ It will be appreciated from the foregoing that, according to the invention as applied to the projection optical system of the type in which three images of original colors formed on a single-panel type liquid crystal display element are projected onto the screen, the projection lens is appropriately designed to produce lateral chromatic aberrations for the original colors with an advantage of diminishing the preeminence of the asymmetric color offsets between the left and right marginal zones of the screen. Thus, the projection lens allows a picture of good quality to be viewed.

In particular, for the single-panel color liquid crystal display device whose form basically contains the cause of producing a color offset, the projection lens to be used is given an optimum condition for correction of lateral chromatic aberration, thereby making it possible to diminish the asymmetry of the color shifts in the left and right marginal zones of the screen.

What is claimed is:

1. A projection optical system for projecting onto a screen an image formed on a display device having a plurality of pixel sets, each of which is composed of at least three pixels arranged in correspondence to at least three color light beams of respective different wavelengths, said projection optical system comprising:

a projection lens formed so that lateral chromatic aberration for a color light beam having a wavelength longer than that of a predetermined color light beam has the same sign as that of lateral chromatic aberration for a color light beam having a wavelength shorter than that of the predetermined color light beam, wherein said projection lens comprises, in order from the screen side:
a first lens unit of a negative refractive power;
a second lens unit of a positive refractive power; and
a third lens unit of a positive refractive power,
wherein a variation of magnification from a wide-angle end to a telephoto end is effected by moving said second lens unit toward the screen side.

2. A projection optical system according to claim 1, wherein said projection lens is so formed that an amount of production of lateral chromatic aberration for the color light beam having a wavelength shorter than that of the predetermined color light beam becomes greater than an amount of production of lateral chromatic aberration for the color light beam having a wavelength longer than that of the predetermined color light beam.

3. A projection optical system according to claim 1, wherein said projection lens has a lens unit movable in an optical axis direction, with a variation of magnification being effected by moving said lens unit.

4. A projection apparatus, comprising:
a display device having a plurality of pixel sets, each of which is composed of at least three pixels arranged in correspondence to at least three color light beams of respective different wavelengths; and
a projection lens for projecting onto a screen an image formed on said display device, said projection lens being formed so that lateral chromatic aberration for a color light beam having a wavelength longer than that of a predetermined color light beam has the same sign as that of lateral chromatic aberration for a color light beam having a wavelength shorter than that of the predetermined color light beam, wherein said projection lens comprises, in order from the screen side:

a first lens unit of a negative refractive power;
a second lens unit of a positive refractive power; and
a third lens unit of a positive refractive power,
wherein a variation of magnification from a wide-angle end to a telephoto end is effected by moving said second lens unit toward the screen side.

5. A projection apparatus according to claim 4, wherein said display device is a liquid crystal display element, and wherein said at least three color light beams are made incident on said liquid crystal display element at respective different angles, so that pixels of said liquid crystal display element corresponding to the respective light beams are illuminated by the respective light beams.

6. A projection apparatus according to claim 4, wherein said projection lens has a lens unit movable in an optical axis direction, with a variation of magnification being effected by moving said lens unit.

* * * * *

UNITED STATES PATENT AND TRADEMARK OFFICE
CERTIFICATE OF CORRECTION

PATENT NO. : 6,467,912 B1
DATED : October 22, 2002
INVENTOR(S) : Masatake Kato

It is certified that error appears in the above-identified patent and that said Letters Patent is hereby corrected as shown below:

<u>Title page,</u>
Item [57], ABSTRACT,
Line 5, "respective" should read -- respectively --.

<u>Column 1,</u>
Line 26, "been becoming" should read -- become --.

<u>Column 2,</u>
Line 2, "Em -parts" should read -- parts --.
Line 4, "41is" should read -- 41 is --.
Line 14, after "44G." close up right margin.
Line 15, before "Therefore," close up the left margin.

<u>Column 3,</u>
Line 15, "cause any affection to" should read -- affecting its --.
Line 42, "comes to hardly occur." should read -- hardly occurs. --.
Line 63, "respective" should read -- respectively --.

<u>Column 4,</u>
Line 10, "respective" should read -- respectively --.

<u>Column 5,</u>
Line 19, "respective" should read -- respectively --.
Line 60, "power,." should read -- power. --.

<u>Column 7,</u>
Line 12, "vi" should read -- υi --.

<u>Column 8,</u>
Lines 25 and 58, "respective" should read -- respectively --.

UNITED STATES PATENT AND TRADEMARK OFFICE
CERTIFICATE OF CORRECTION

PATENT NO. : 6,467,912 B1
DATED : October 22, 2002
INVENTOR(S) : Masatake Kato

It is certified that error appears in the above-identified patent and that said Letters Patent is hereby corrected as shown below:

<u>Column 9,</u>
Line 10, "respective" should read -- respectively --.

Signed and Sealed this

Twenty-fifth Day of March, 2003

JAMES E. ROGAN
*Director of the United States Patent and Trademark Office*